United States Patent
Kondou

(10) Patent No.: US 7,785,676 B2
(45) Date of Patent: Aug. 31, 2010

(54) OPTICAL COMPENSATION SHEET, POLARIZING PLATE, AND LIQUID CRYSTAL DISPLAY DEVICE

(75) Inventor: Shunichi Kondou, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 315 days.

(21) Appl. No.: 12/091,120

(22) PCT Filed: Oct. 27, 2006

(86) PCT No.: PCT/JP2006/322036

§ 371 (c)(1),
(2), (4) Date: Apr. 22, 2008

(87) PCT Pub. No.: WO2007/049814

PCT Pub. Date: May 3, 2007

(65) Prior Publication Data

US 2009/0122233 A1    May 14, 2009

(30) Foreign Application Priority Data

Oct. 27, 2005    (JP) .............................. 2005-312276

(51) Int. Cl.
G02B 5/30 (2006.01)
G02F 1/13363 (2006.01)
G02F 1/1335 (2006.01)

(52) U.S. Cl. .................. 428/1.1; 428/1.31; 349/75; 349/96; 349/117; 359/500

(58) Field of Classification Search .................. 428/1.1, 428/1.31; 349/75, 96, 117; 359/500
See application file for complete search history.

(56) References Cited

U.S. PATENT DOCUMENTS

| 5,327,271 | A | * | 7/1994 | Takeuchi et al. ............... 349/88 |
| 5,583,679 | A | | 12/1996 | Ito et al. |
| 5,646,703 | A | | 7/1997 | Kamada et al. |
| 5,805,253 | A | | 9/1998 | Mori et al. |
| 5,855,971 | A | | 1/1999 | Kobori et al. |
| 5,883,685 | A | | 3/1999 | Mazaki et al. |
| 6,184,957 | B1 | | 2/2001 | Mori et al. |
| 6,582,776 | B2 | * | 6/2003 | Yip et al. ..................... 427/514 |
| 2002/0033479 | A1 | | 3/2002 | Sugiyama et al. |

FOREIGN PATENT DOCUMENTS

| DE | 39 11 620 A1 | 10/1990 |
| JP | 6-214116 A | 8/1994 |
| JP | 9-026572 A | 1/1997 |
| JP | 10-054982 A | 2/1998 |
| JP | 2866372 B2 | 3/1999 |
| JP | 2001-133968 A | 5/2001 |
| JP | 2003-195050 A | 7/2003 |
| WO | WO 96/37804 A1 | 11/1996 |

OTHER PUBLICATIONS

Form PCT/ISA/210 (International Search Report) dated Feb. 6, 2007.
Form PCT/ISA/237 (Written Opinion of the International Searching Authority) dated Feb. 6, 2007.
Notification Concerning Transmittal of International Preliminary report on Patentability, International Preliminary Report on Patentability and Attached Written Opinion (Forms PCT/IB/326, PCT/IB/373 and PCT/ISA/237) mailed by the International Bureau on May 8, 2008 in corresponding PCT/JP2006/322036, The International Bureau of WIPO, Geneva, Switzerland.

* cited by examiner

*Primary Examiner*—Shean C Wu
(74) *Attorney, Agent, or Firm*—Buchanan Ingersoll & Rooney PC

(57) ABSTRACT

An optical compensation sheet having, on a transparent support, an optically anisotropic layer comprising a liquid crystalline compound fixed by using a photo-polymerization initiator system, wherein the photo-polymerization initiator system comprises at least one acylphosphine compound and at least one aromatic ketone compound selected from the group consisting of xanthene compounds, xanthone compounds, thioxanthone compounds and acridone compounds, which has less coloring and can be produced with less-power UV light, is provided.

7 Claims, No Drawings

OPTICAL COMPENSATION SHEET, POLARIZING PLATE, AND LIQUID CRYSTAL DISPLAY DEVICE

TECHNICAL FIELD

The present invention relates to an optical compensation sheet having an optically anisotropic layer comprising a liquid crystalline compound fixed by using a photo-polymerization initiator, and a polarizing plate and a liquid crystal display device employing the same.

BACKGROUND ART

Liquid crystal display device comprises a liquid crystal cell, polarizing elements, and an optical compensation sheet (a retardation plate). In a transmissive liquid crystal display device, polarizing element is attached to each of two sides of a liquid crystal cell, and between the liquid crystal cell and either one of the polarizing elements, at least one optical compensation sheet is arranged.

A reflective liquid crystal display device is configured generally by arranging a reflector plate, a liquid crystal cell, at least one optical compensation sheet, and a polarizing element in this order. The liquid crystal cell comprises liquid-crystalline molecules, two substrates encapsulating the liquid-crystalline molecules, and electrode layers applying voltage to the liquid-crystalline molecules. For liquid crystal cell, various display modes are proposed depending on variation in orientation state of the liquid-crystalline molecules: TN (twisted nematic), IPS (in-plane switching), FLC (ferroelectric liquid crystal), OCB (optically compensatory bend), STN (supper twisted nematic) and VA (vertically aligned) for a transmissive liquid crystal display device, and HAN (hybrid aligned nematic) for a reflective liquid crystal display device.

The optical compensation sheet has been employed in various liquid crystal display devices in order to cancel coloring of images, and to expand the viewing angle. As an optical compensation sheet, a stretched polymer film was conventionally used. However in recent years, there has been proposed a use of an optical compensation sheet comprising an optically anisotropic layer formed by applying a liquid crystalline composition comprising a liquid crystalline compound to a transparent support in place of the stretched polymer film. As various orientation states can be obtained with liquid crystalline compounds, optical characteristics which have never been obtained by the conventional stretched polymer film can be achieved by using a liquid crystalline compound. Optical compensation sheets for various display modes of a liquid crystal cell using liquid crystalline compounds have been already proposed. For example, Japanese Laid-Open Patent Publication "Tokkaihei" No. 6-214116, U.S. Pat. Nos. 5,583,679 and 5,646,703, and German Patent Application Publication No. 3911620 disclose an optical compensation sheet for a TN mode liquid crystal cell. Japanese Laid-Open Patent Publication "Tokkaihei" No. 10-54982 discloses an optical compensation sheet for IPS and FLC mode liquid crystal cells. U.S. Pat. No. 5,805,253 and WO 96/37804 discloses an optical compensation sheet for OCB and HAN mode liquid crystal cells; Japanese Laid-Open Patent Publication "Tokkaihei" No. 9-26572 discloses an optical compensation sheet for STN mode liquid crystal cell; and Japanese Patent No. 2866372 discloses an optical compensation sheet for VA mode liquid crystal cell.

SUMMARY OF THE INVENTION

The preparation process of an optical compensation sheet comprising an optically anisotropic layer formed of a liquid crystalline composition, which can be prepared by providing an alignment layer and an optically anisotropic layer comprising a liquid crystalline compound, involves a step of polymerizing and hardening the optically anisotropic layer by strong UV light. Therefore, an optical compensation sheet which can be prepared with less UV light intensity in said step was required from the viewpoint of high speed production and resource saving. The optical compensation sheet is at the same time required to have characteristics such as less coloring property which are desired for an optical compensation sheet.

An object of the present invention is thus to provide an optical compensation sheet which has less coloring, and enables high speed production with low-power UV light.

In order to achieve the above object, the inventor of the present invention conducted extensive study on a photo-polymerization initiator which is added to the composition for forming an optically anisotropic layer. As a result, he found that a liquid crystalline compound polymerizes with low-power UV light by using a combination of an acylphosphine compound and an aromatic ketone compound such as thioxanthone. The present invention was achieved on the basis of the above findings.

The present invention thus provides the following [1] to [7].

[1]. An optical compensation sheet having an optically anisotropic layer comprising a liquid crystalline compound fixed by using a photo-polymerization initiator system on a transparent support, wherein the photo-polymerization initiator system comprises at least one acylphosphine compound and at least one aromatic ketone compound selected from the group consisting of xanthene compounds, xanthone compounds, thioxanthone compounds, and acridone compounds.

[2]. The optical compensation sheet according to [1], wherein the liquid crystalline compound is fixed at an oriented state by polymerization.

[3]. The optical compensation sheet according to [1] or [2], which further comprises an alignment film.

[4]. The optical compensation sheet according to [3], wherein the alignment film comprises an organic compound having a polymerizable group.

[5]. The optical compensation sheet according to any one of [1] to [4], wherein the transparent support is a cellulose acylate film.

[6]. A polarizing plate which comprises the optical compensation sheet according to any one of [1] to [5], a transparent protective film, and a polarizing film.

[7]. A liquid crystal display device which comprises the polarizing plate according to [6] and a liquid crystal cell.

DETAILED DESCRIPTION OF THE INVENTION

The present invention will be explained below. In the specification, ranges indicated with "to" mean ranges including the numerical values before and after "to" as the minimum and maximum values.

And in the specification, Re (λ) and Rth (λ) respectively mean an in-plane retardation and a retardation in a thickness-direction at wavelength λ. The Re(λ) is measured by using KOBRA-21ADH (manufactured by Oji Scientific Instruments) for an incoming light of a wavelength λ nm in a vertical direction to a film-surface. The Rth(λ) is calculated by using KOBRA-21ADH based on three retardation values: first one of which is the Re obtained above, second one of which is retardation which is measured for an incoming light in a direction rotated by +40° with respect to the normal direction of the film around an in-plane slow axis, which is decided by KOBRA 21ADH, as an inclining axis (a rotation axis), and third one of which is a retardation which is measured for an incoming light in a direction rotated by −40° with respect to the normal direction of the film around an in-plane slow axis as an inclining axis (a rotation axis); a value entered as a hypothetical mean refractive index; and a value entered as a thickness value of the film. The mean refractive indexes of various materials are described in published documents such as "POLYMER HANDBOOK" (JOHN WILEY&SONS, INC) and catalogs of various optical films, and can be used for the above calculation. If the values are unknown, the values may be measured with an abbe refractometer or the like. The mean refractive indexes of major optical films are exemplified below:

cellulose acylate (1.48), cyclo-olefin polymer (1.52), polycarbonate (1.59), polymethyl methacrylate (1.49), polystyrene (1.59).

When a value of hypothetical mean refractive index and a thickness of the film are entered, KOBRA 21ADH calculates the values of nx, ny and nz.

The optical compensation sheet of the present invention is configured by providing an optically anisotropic layer comprising a liquid crystalline compound on a transparent support. An alignment layer is preferred to be further provided between the transparent support and the optically anisotropic layer. When two or more optically anisotropic layers are provided, an alignment layer may be provided on the optically anisotropic layer. In addition, a primer layer may be provided between the transparent support and the alignment layer in order to improve the adhesion, or a protective layer may be provided on the optically anisotropic layer in order to protect the surface. The composition for forming an optically anisotropic layer mainly comprises a liquid crystalline compound which expresses optical anisotropy, polymer binder, and a photo-polymerization initiator. The composition may be further added with additives such as a monomer, a surfactant, an orientation temperature lowering agent, a chiral agent, and the like, if necessary. The thickness of the optically anisotropic layer is preferably 0.5 to 100 μm, and more preferably 0.5 to 30 μm.

[Liquid Crystalline Compound]

As the liquid crystalline compound, rod-like liquid crystalline compounds and discotic liquid crystalline compounds are preferred. In the specification, "a liquid crystalline compound" includes compounds not presenting a liquid-crystallinity after polymerization of the exemplified compounds as well as the below-exemplified compounds showing liquid-crystallinity.

As the rod-like liquid crystalline compound, azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyl dioxanes, tolans and alkenylcyclohexyl benzonitriles are preferably used. Fixing of these rod-like liquid crystalline compounds can be conducted by introducing a polymerizable group (example are the same as those of the discotic liquid crystalline compounds shown below) into terminal structure of the rod-like liquid crystalline compound and by conducting polymerization/hardening reaction. High-molecular weight liquid crystalline compounds as well as the above-listed low-molecular weight liquid crystalline compounds may also be used. The high-molecular weight liquid crystalline compounds may be polymers which have residues corresponding to the above-listed low-molecular weight liquid crystalline compounds. Japanese Laid-Open Patent Publication "Tokkaihei" No. 5-53016 describes an optical compensation sheet wherein a high-molecular weight liquid crystalline compound is used.

Examples of the discotic liquid crystalline compound are described in various publications (e.g., C. Destrade et al., *Mol. Cryst. Liq. Cryst.*, Vol. 71, page 111 (1981); *Quarterly Outline of Chemistry*, No. 22, Chemistry of Liquid Crystal, Chap. 5, Chap. 10, Sec. 2 (1994), by the Chemical Society of Japan; B. Kohne et al., *Angew. Chem. Soc. Chem. Comm.*, page 1794 (1985); J. Zhang et al., *J. Am. Chem. Soc.*, Vol. 116, page 2655 (1994)). The polymerization of discotic liquid crystalline compounds is described in Japanese Laid-Open Patent Publication No. hei 8-27284.

Polymerizable group as a substituent may be necessarily bonded to the disk-shaped core of a discotic liquid-crystalline molecule to fix the discotic liquid-crystalline molecules by polymerization. However, when a polymerizable group is directly bonded to the disk-shaped core, the alignment state is hard to be maintained during polymerization reaction. Accordingly, a linking group is preferably introduced between the disk-shaped core and the polymerizable group. That is, the discotic liquid crystalline compound is preferably a compound represented by the following Formula (I).

D(-L-P)$_n$     Formula (I)

In the formula (I), "D" represents a discotic core, L represents a divalent linking group, P represents a polymerizable group and n is an integer from 4 to 12.

Examples of the core, "D", are shown below. In the examples, LP (or PL) means a combination of a divalent linking group (L) and a polymerizable group (P).

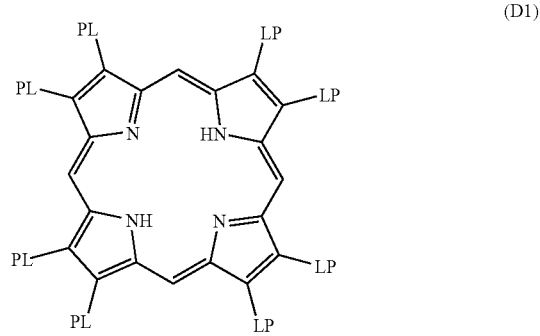

(D1)

(D2)
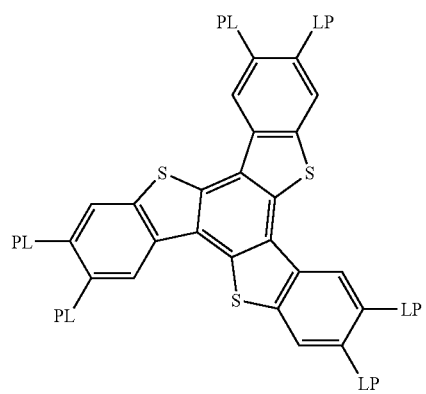
(D3)
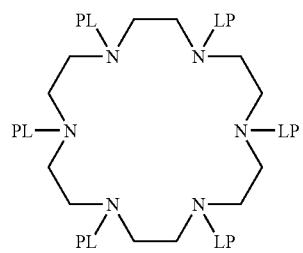
(D4)
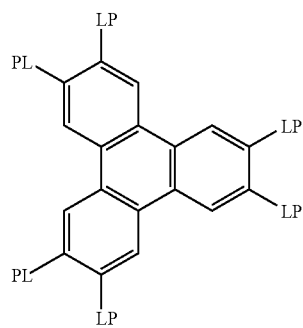
(D5)
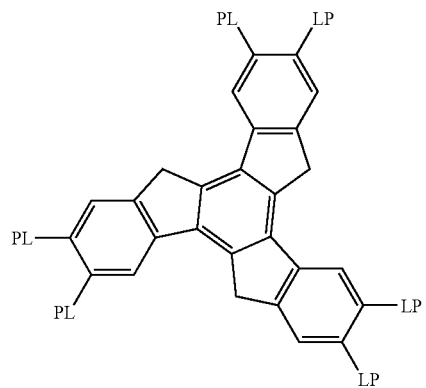
(D6)
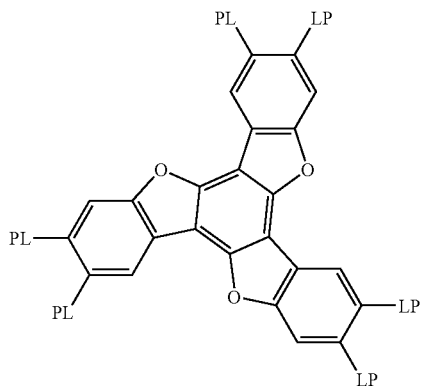
(D7)
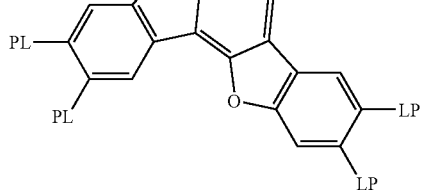
(D8)
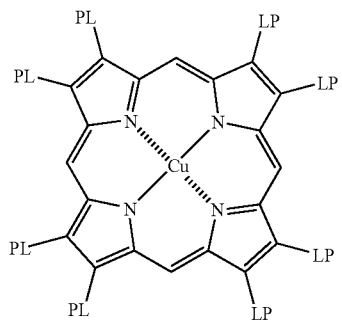
(D9)
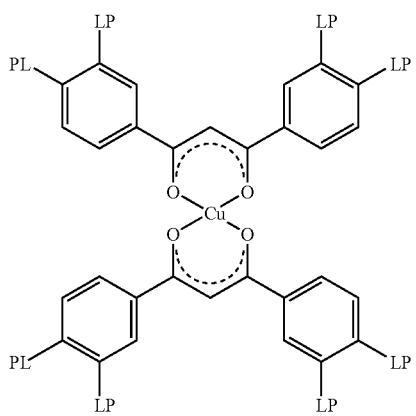
(D10)
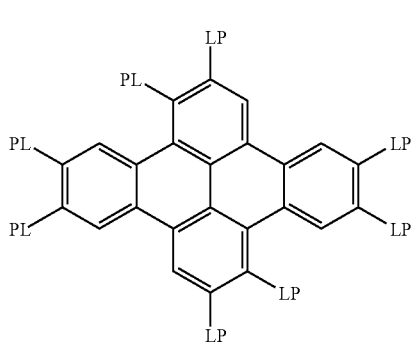

-continued

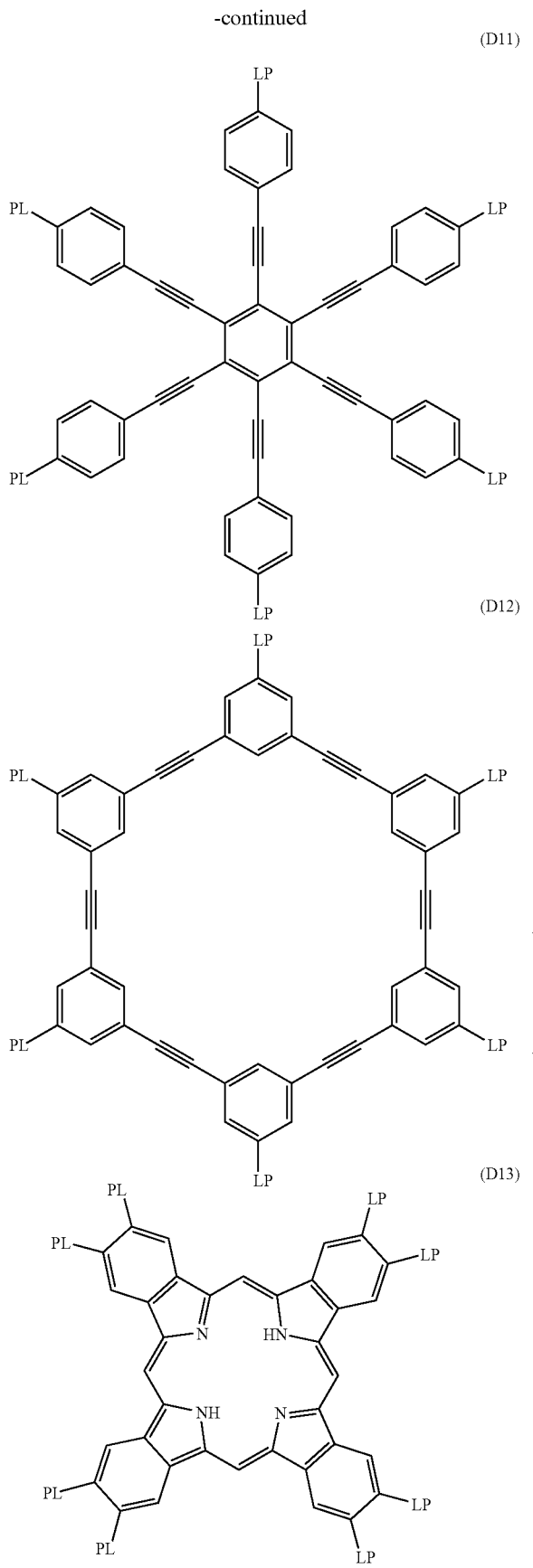

(D11)

(D12)

(D13)

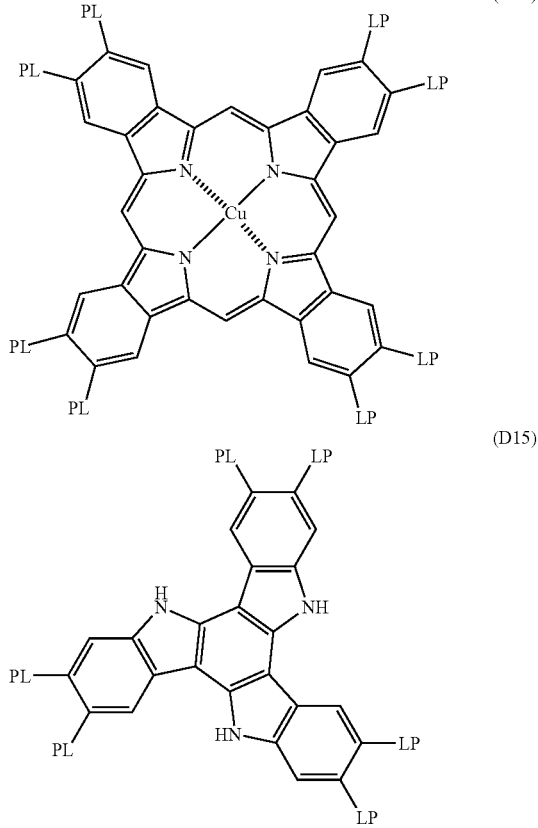

(D14)

(D15)

In the above Formula (I), divalent linking group (L) is desirably selected from the group consisting of an alkylene group, alkenylene group, arylene group, —CO—, —NH—, —O—, —S— and any combinations thereof. The divalent linking group (L) is preferably a group combining at least two divalent groups selected from the group consisting of an alkylene group, an arylene group, —CO—, —NH—, —O—, and —S—. Most preferably, the divalent linking group (L) is a group combining at least two divalent groups selected from the group consisting of an alkylene group, an arylene group, —CO— and —O—. The alkylene group desirably comprises from 1 to 12 carbon atoms. The alkenylene group desirably comprises form 2 to 12 carbon atoms. The arylene group desirably comprises from 6 to 10 carbon atoms.

Examples of the divalent linking group (L) are shown below. Each of them is bonded on the left to disk-shaped core (D) and on the right to polymerizable group (P). "AL" denotes an alkylene group or alkenylene group, and "AR" denotes an arylene group. The alkylene group, alkenylene group or arylene group may have a substituent such as an alkyl group.

L1: -AL-CO—O-AL-
L2: -AL-CO—O-AL-O—
L3: -AL-CO—O-AL-O-AL-
L4: -AL-C—O-AL-O—CO—
L5: —CO-AR-O-AL-
L6: —CO-AR-O-AL-O—
L7: —CO-AR-O-AL-O—CO—
L8: —CO—NH-AL-
L9: —NH-AL-O—
L10: —NH-AL-O—CO—
L11: —O-AL-

L12: —O-AL-O—
L13: —O-AL-O—CO—
L14: —O-AL-O—CO—NH-AL-
L15: —O-AL-S-AL-
L16: —O—CO-AR-O-AL-CO—
L17: —O—CO-AR-O-AL-O—CO—
L18: —O—CO-AR-O-AL-O-AL-O—CO—
L19: —O—CO-AR-O-AL-O-AL-O-AL-O—CO—
L20: —S-AL-
L21: —S-AL-O—
L22: —S-AL-O-CO—
L23: —S-AL-S-AL-
L24: —S-AR-AL-

In the Formula (I), the polymerizable group (P) may be selected depending on the manner of polymerization. Examples of the polymerizable group are shown below.

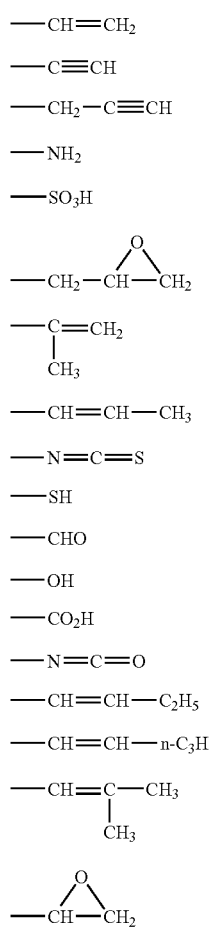

As the polymerizable group (P), unsaturated polymerizable groups (P1, P2, P3, P7, P8, P15, P16, P17) or epoxy groups (P6, P18) are preferred, unsaturated polymerizable groups are more preferred, and ethylene-type unsaturated polymerizable groups (P1, P7, P8, P15, P16, P17) are most preferred.

In the Formula (I), n is an integer from 4 to 12. n is determined depending on the species of the discotic core (D). The plural combinations of L and P may be different or identical each other, however, are preferably identical to each other. Liquid crystalline compounds are used in a range of 50 to 99.9% by weight, preferably 70 to 99.9% by weight, more preferably 80 to 99.9% by weight with respect to the total weight of the optically anisotropic layer.

Binder Polymer

Binder polymer is used for the purpose of controlling the temperature of liquid crystal phase transition and optical characteristics, and improving coating property. Specific examples of the polymer compound include polymethylmethacrylate, acrylic acid/methacrylic acid copolymer, styrene/maleimide copolymer, polyvinyl alcohol, poly(N-methyrol acrylamide), styrene/vinyl toluene copolymer, chlorosulfonated polystyrene, nitro cellulose, cellulose esters, poly vinyl chloride, chlorinated polyethylene, polyester, polyimide, vinyl acetate/vinyl chloride copolymer, ethylene/vinyl acetate copolymer, polyethylene, polypropylene, polycarbonate, a silicone-type polymer, and a fluorine-containing polymer. A polymer which does not affect the optical characteristics is convenient to be used, whereas another polymer which affects the optical characteristics can be actively used as a material for controlling the optical characteristics. Japanese Laid-Open Patent Publication No. hei 8-27284 reports that cellulose esters are suitable for controlling the tilt angle of a discotic liquid crystalline compound to obtain desired optical characteristics. Preferable examples of cellulose esters include cellulose acetate, cellulose acetate propionate, hydroxypropyl cellulose, and cellulose acetate butylate. Butyrylation degree of cellulose acetate butylate is preferred to be in a range of 30 to 80%, and acetylation degree is preferred to be in a range of 30 to 80%.

These polymer compounds are used in a range of 0.1 to 30% by weight, preferably 0.1 to 10% by weight with respect to the total weight of the optically anisotropic layer.

Photo-Polymerization Initiator System

Photo-polymerization initiator system used in the present invention is a system wherein an acylphosphine compound and an aromatic ketone compound are combined. As the aromatic ketone compound, one or more compounds can be selected from a group consisting of xanthene compounds, xanthone compounds, thioxanthone compounds and acridone compounds.

For fixing of liquid crystalline molecules, the following compounds are conventionally known to be used: α-carbonyl compounds (described in U.S. Pat. Nos. 2,367,661 and 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in U.S. Pat. Nos. 3,046,127 and 2,951,758), combinations of triarylimidazole dimers and p-aminophenyl ketone (described in U.S. Pat. No. 3,549,367), acridine and phenazine compounds (described in Japanese Laid-Open Patent Publication (Tokkai) syo No. 60-105667 and U.S. Pat. No. 4,239,850) and oxadiazole compounds (described in U.S. Pat. No. 4,212,970). However, each of the above compounds has low sensitivity, and therefore UV source having high energy had to be used upon production.

In the technical fields of resists using photo-polymerization technique and planographic printing, photo-polymerization initiators described in the specifications of Japanese Laid-Open Patent Publication (Tokkai) hei Nos. 5-5988, 5-72732, 5-107758, 5-281728, 6-266102, 8-202035, 8-234428, 8-234429, 8-305019, 8-339076, and 9-5993, and Japanese Laid-Open Patent Publication (Tokkai) Nos. 2003-280187, 2004-29296, 2004-258648, and 2005-84092 are known. Although some of the initiators are found to have high sensitivities, significant coloring of films are found after light irradiation. Therefore, the initiators cannot be applied to the production of an optical compensation sheet which requires colorlessness and transparency.

An acylphosphine compound is disclosed to relatively effectively generate a polymerization initiating radicals by UV light in Tsumiyoshi et al, J. Photochem., 30, 63(1985), Tsumiyoshi et al, J. Photochem., 32, 119(1986), Tsumiyoshi et al, J. Photochem., 32, 63(1986) and the like. An aromatic ketone compound is disclosed to be as an effective photo-polymerization initiator by UV light in L. R. Gatechair, D. Wostratzky, J. Radiat. Curing., 10(3), 4(1983). In the present invention, it was found as described above that, by combining these photo-polymerization initiators, a photo-polymerization initiator system with significantly higher sensitivity than the sensitivity of each of the photo-polymerization initiators used independently, can be obtained, and that a liquid crystalline compound consequently polymerizes by low-power UV light. As the acylphosphine compound, the xanthene compound, the xanthone compound, the thioxanthone compound and the acridone compound, compounds selected from known compounds including the compounds described in the above publications can be used.

Specific examples of the acylphosphine compound include, but are not limited to, the following compounds.

A-1
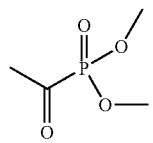

A-2
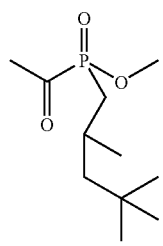

A-3
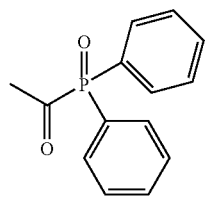

A-4
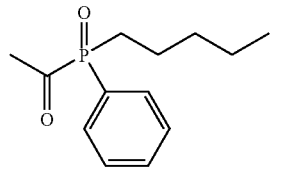

A-5
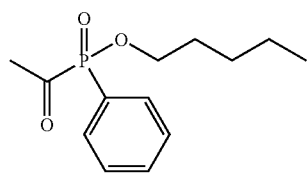

-continued

A-6
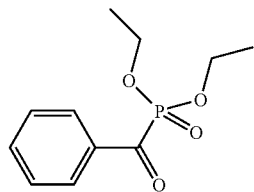

A-7
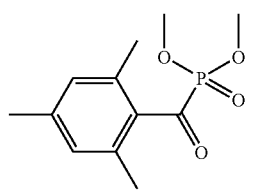

A-8
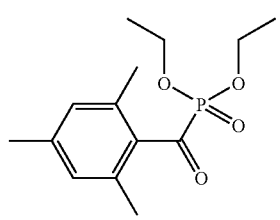

A-9
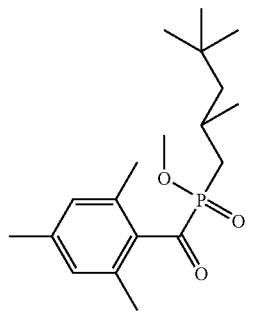

A-10
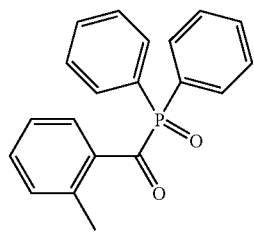

A-11
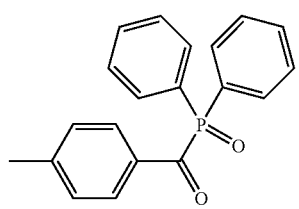

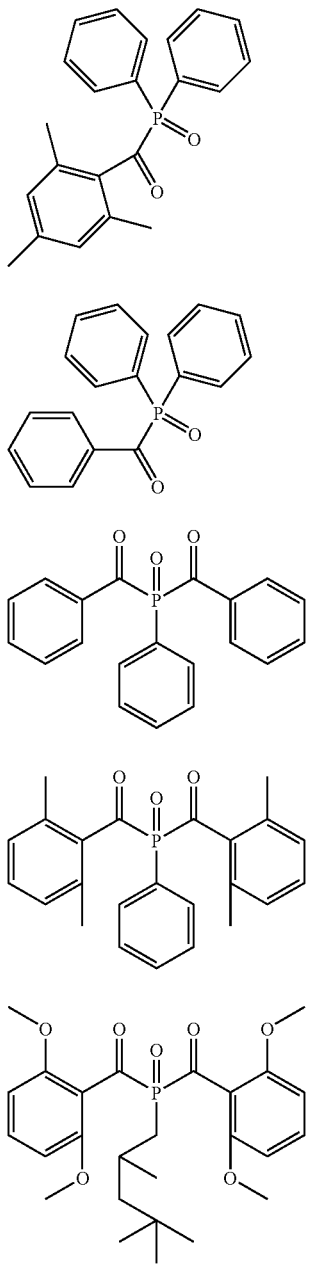
A-12
A-13
A-14
A-15
A-16
As the aromatic ketone compound such as xanthene compounds, xanthone compounds, thioxanthone compounds and acridone compounds, a compound having at least two phenyl rings is preferred. Specific examples include, but are not limited to, the following compounds.
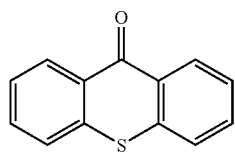
B-1
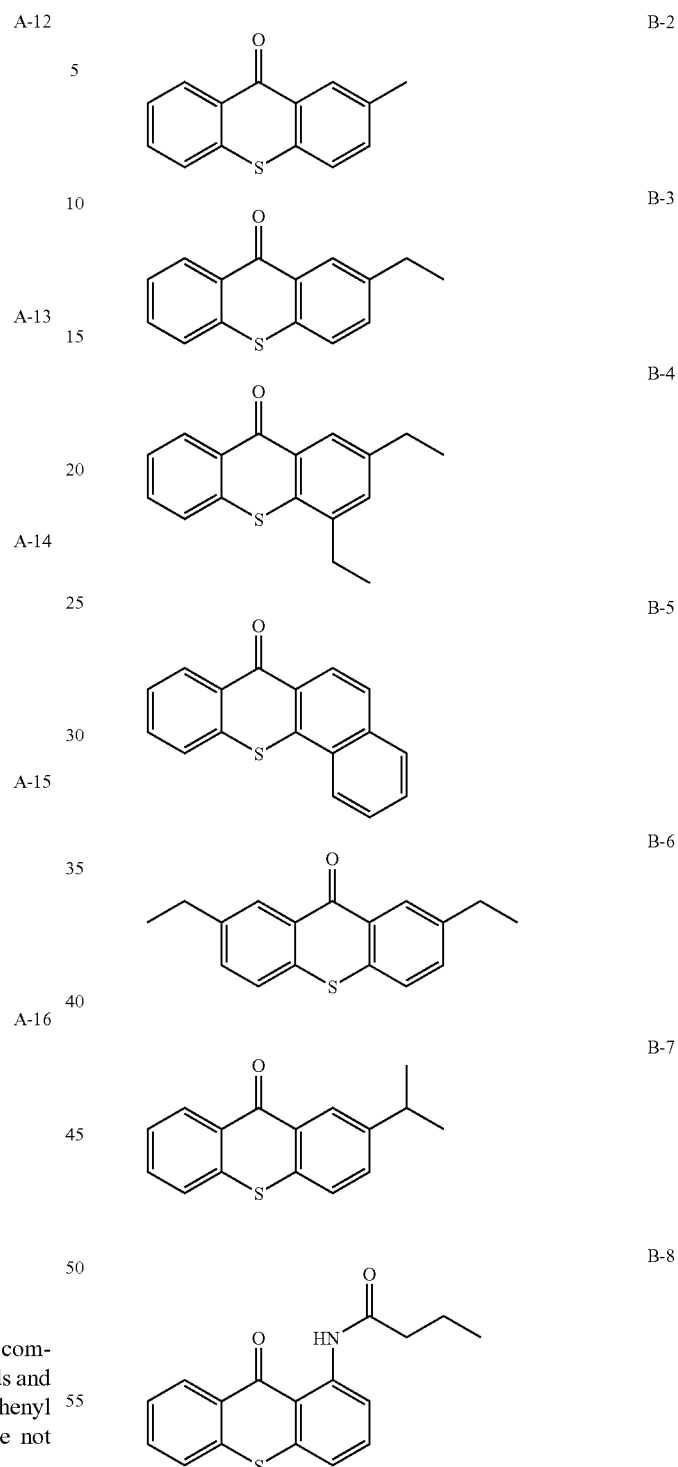
B-2
B-3
B-4
B-5
B-6
B-7
B-8
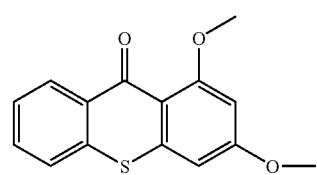
B-9

-continued
B-10
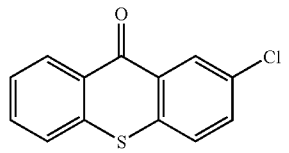
C-1
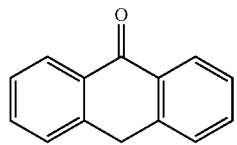
C-2
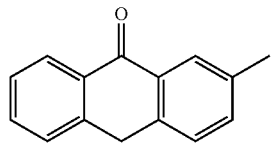
C-3
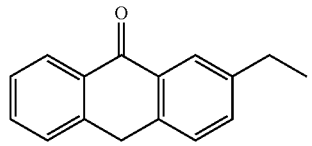
C-4
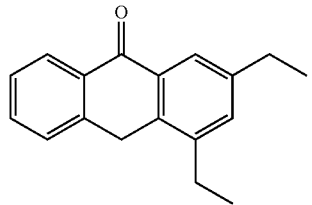
C-5
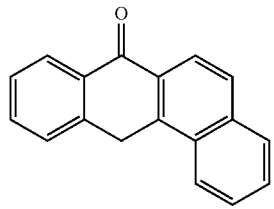
D-1
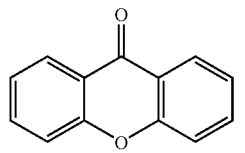
D-2
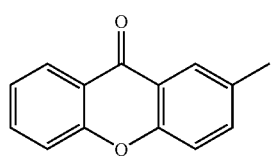
D-3
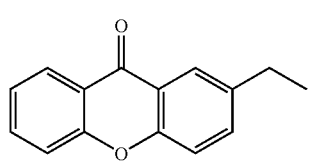
-continued
D-4
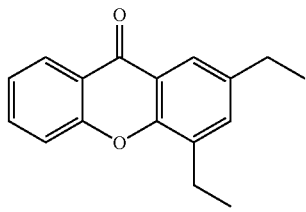
D-5
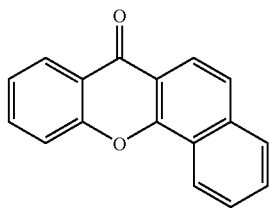
E-1
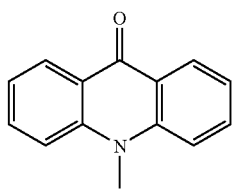
E-2
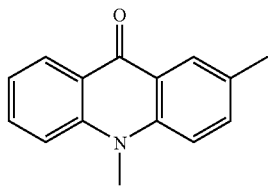
E-3
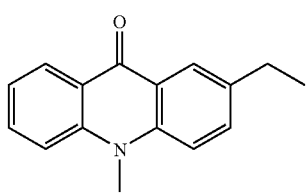
E-4
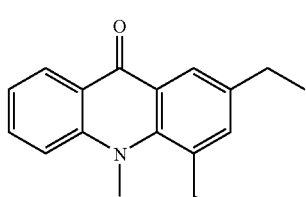
E-5
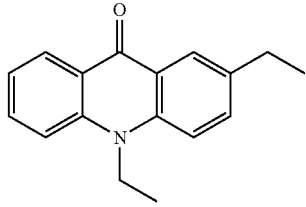

-continued

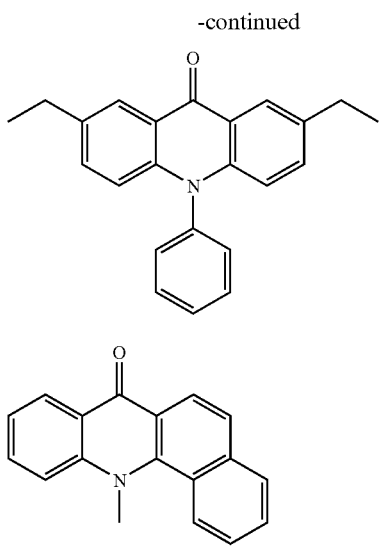

E-6

E-7

When the acylphosphine compound and the aromatic ketone compound are used in combination, the two compounds are mixed in a weight ratio of 1:99 to 99:1, preferably 1:9 to 9:1, more preferably 1:5 to 5:1. The total amount of the photo-polymerization initiators is preferably 0.01 to 20% by weight, more preferably 0.5 to 5% by weight with respect to the total weight of the optically anisotropic layer.

Other Additives

In addition to the above-mentioned components, a plasticizer, a polymerizable monomer, a chiral agent or the like can be added to the composition for forming the optically anisotropic layer, depending on the needs, for example for controlling the optical characteristics, obtaining the plasticity of the coat, or assisting the polymerization/hardening reaction. Among these, a polymerizable monomer is relatively common additive to be used. A polymerizable monomer is a compound which has vinyl group, vinyloxy group, acryloyl group, methacryloyl group, aryl group or the like. The content of the compound with respect to the discotic liquid crystalline compound is preferably 1 to 50% by weight, and more preferably 5 to 30% by weight.

Preparation of the Optically Anisotropic Layer

The optically anisotropic layer can be formed by applying a liquid crystalline composition comprising the above mentioned components to an alignment layer described below, conducting alignment at the transition temperature from liquid crystalline phase to solid phase or a lower temperature, and then fixing the liquid crystalline compounds by UV irradiation. The coating with the liquid crystalline composition can be carried out by known methods (a wire-bar coating method, an extrusion coating method, a direct gravure coating method, a reverse gravure coating method and a die coating method). The transition temperature of liquid crystal phase-solid phase of the liquid crystalline compound is preferably 70 to 300° C., and more preferably 70 to 170° C. As the polymerization reaction of the liquid crystalline compound, a photo-polymerization reaction wherein a photo-polymerization initiator is used is preferably conducted. Irradiation for polymerizing the liquid-crystalline molecules preferably uses ultra violet rays. The irradiation energy is preferably 20 to 5000 mJ/cm$^2$ and more preferably 100 to 800 mJ/cm$^2$. Irradiation may be carried out under heating to accelerate the photo-polymerization reaction.

Alignment Layer

An alignment layer can be prepared by means of the rubbing treatment of an organic compound (preferably a polymer), the oblique evaporation of an inorganic compound, formation of a layer having microgrooves, or accumulation of organic compounds (e.g., ω-tricosanic acid, dioctadecylmethylammonium chloride and methyl stearate) by Langmuir-Blodgett method (LB film). The alignment layer in the optically compensation sheet of the present invention is preferably formed of an organic compounds having a polymerizable group. Further, an alignment layer that exhibits an alignment function by a given electric field, a given magnetic field or light irradiation, is also known. Types of the polymer used for the alignment layer can be determined depending on the types of liquid crystal cell display mode. For display modes such as VA, OCB, and HAN, wherein most of rod-shaped liquid crystalline molecules in a liquid crystal cell are substantially vertically aligned (the director is parallel to the normal direction of the transparent support) when no voltage is applied, an alignment layer which has function to align liquid crystalline molecules in the optically anisotropic layer substantially horizontal (when discotic liquid crystalline molecules are used, the director is parallel to the normal direction of the transparent support) may be used.

For display modes such as STN, wherein most of rod-shaped liquid crystalline molecules in a liquid crystal cell are substantially horizontally aligned when no voltage is applied, an alignment layer which has function to align liquid crystalline molecules in the optically anisotropic layer substantially vertical may be used. For display modes such as TN, wherein most of rod-shaped liquid crystalline molecules in a liquid crystal cell are substantially obliquely aligned when no voltage is applied, an alignment layer which has function to align liquid crystalline molecules in the optically anisotropic layer substantially oblique may be used.

Types of specific organic compounds used for the alignment layer in the optical compensation sheet of the present invention are described in publications about an optical compensation sheet using liquid crystalline molecules suitable for the display mode of a liquid crystal cell. By introducing cross-linking groups to an organic compound used for the alignment layer, and allowing the cross-linking groups to react, film strength and adherence between layers can be improved. Japanese Laid-Open Patent Publication (Tokkai) hei No. 8-338913 discloses polymerization of an organic compound used for the alignment layer. The thickness of the alignment layer is preferably 0.01 to 5 μm, more preferably 0.05 to 2 μm. Examples of the above organic compound used for the alignment layer of the present invention include polymers such as poly methyl methacrylate, acrylic acid/methacrylic acid copolymer, styrene/maleimide copolymer, polyvinyl alcohol, modified polyvinyl alcohol, poly(N-methyrol acrylamide), styrene/vinyl toluene copolymer, chlorosulfonated polystyrene, nitro cellulose, poly chlorinated methyl cellulose, polyethylene, polypropylene, and polycarbonate; and compounds such as silane coupling agent.

Examples of preferable polymer as the organic compound used for the alignment layer of the present invention include water-soluble polymers such as poly (N-methyrol acrylamide), carboxy methyl cellulose, gelatin, polyvinyl alcohol and modified polyvinyl alcohol. Among these, gelatin, polyvinyl alcohol and modified polyvinyl alcohol are preferred; and polyvinyl alcohol and modified polyvinyl alcohol are more preferred.

As the polyvinyl alcohol, polyvinyl alcohols having a saponification degree of 70 to 100% can be used, those having a saponification degree of 80 to 100% are preferably used, and those having a saponification degree of 85 to 95% are more preferably used. The polymerization degree of polyvinyl alcohol is preferably from 100 to 3000. Examples of modified polyvinyl alcohol include polyvinyl alcohols modified by copolymerization such as polyvinyl alcohols having COONa, $Si(OX)_3$, $N(CH_3)_3Cl$, $C_9H_{19}COO$, $SO_3Na$, $C_{12}H_{25}$ or the like as a modified group; polyvinyl alcohols modified by chain transfer reaction such as polyvinyl alcohols having COONa, SH, $SC_{12}H_{25}$ or the like as a modified group; and polyvinyl alcohols modified by block polymerization such as polyvinyl alcohols having COOH, $CONH_2$, COOR, $C_6H_5$ or the like as a modified group. The polymerization degree of the modified polyvinyl alcohol is preferably from 100 to 3000.

Among these, modified or non-modified polyvinyl alcohols having a saponification degree of 80 to 100% are preferred, and non-modified having a saponification degree of 85 to 95% or alkylthio-modified polyvinyl alcohols having a saponification degree of 85 to 95% are more preferred.

Transparent Support

As the transparent support of the optical compensation sheet, a polymer film having a controlled optical anisotropy is preferably used. "Transparency" with respect to a support means that the support has light transmission of 80% or more.

As materials for the transparent support, cellulose esters, polycarbonates, polysulfones, polyeter sulfones, polyacrylates, polymethacrylates, or norbornene resins can be used. By stretching the polymer film, a desired optical anisotropy can be obtained. Additionally, a retardation-increasing agent (described in the specification of European Patent 0 911 656 A2) can be added to a cellulose ester film to obtain a cellulose ester film with high optical anisotropy. As a transparent support in the optical compensation sheet of the present invention, a cellulose acylate film is particularly preferred.

A cellulose ester film and a synthesized polymer film are preferably formed by a solution casting method. The thickness of a transparent support is preferably 20 to 500 μm, and more preferably 50 to 200 μm. In order to improve adhesiveness between the support and a layer provided thereon (an adhesive layer, an alignment layer or an optically anisotropic layer), the surface treatment (e.g., a glow discharge treatment, a corona discharge treatment, an ultraviolet (UV) radiation treatment, a flame treatment, a saponification treatment) may be performed on the support. On the support, an adhesive layer (an undercoat layer) may be provided.

Protective Film

A protective film may be provided on the optically anisotropic layer of the optical compensation sheet of the present invention. A protective film is provided for the purpose of protecting the surface of the optically anisotropic layer, improving smoothness of the surface, and the like. Compounds used for the protective film are not particularly limited, and preferred to be polymer compounds soluble to a solvent which does not dissolve the optically anisotropic layer, and having film-forming ability. Specific examples include gelatin, methyl cellulose, alginic acid, pectine gum arabic, pullulan, polyvinyl alcohol, polyvinyl pyrrolidone, polyacrylic amide, polyvinyl benzenesulfonate sodium salt, carrageenan, and polyethyleneglycol.

Liquid Crystal Display Device

The optical compensation sheet of the present invention can be used in liquid crystal display devices of various display mode such as TN (Twisted Nematic), IPS (In-Plane Switching), FLC (Ferro Electric Liquid Crystal), OCB (Optically Compensatory Bend), STN (Super Twisted Nematic), VA (Vertically Aligned), and HAN (Hybrid Aligned Nematic). A liquid crystal display device having the optical compensation sheet of the present invention may comprise a liquid crystal cell and a polarizing plate, wherein the polarizing plate comprises the optical compensation sheet (retardation plate), protective film, and a polarizing film. As the polarizing film, examples include an iodine-based polarizing film, a dye-based polarizing film which uses a dichromatic dye, and a polyene-based polarizing film. In general, polyvinyl alcohol-based films are used to produce iodine-based polarizing films and dye-based polarizing films. The polarizing axis of the polarizing film corresponds to the vertical direction of the stretching direction of the film. A protective film may be provided on each side if the polarizing film, and the transparent support in the optical compensation sheet may function as one of the protective films. The other of the protective films is preferred to be a cellulose ester film which has high optical isotropy.

EXAMPLES

Hereinafter, the present invention will be further described in detail with reference to Examples and Comparative Examples. Materials, contents, ratios, processing contents, processing order and the like as presented below may be suitably modified as long as the object of the invention is not impaired. The scope of the invention is not limited to these specific examples below.

Comparative Example 1

Preparation of a Transparent Support

The following composition was charged in a mixing tank and stirred under heating, to dissolve the individual ingredients to prepare a cellulose acetate solution.

| <Composition of cellulose acetate solution (part by weight)> | |
|---|---|
| Cellulose acetate with an acetylation degree of 60.9% | 100 |
| Triphenyl phosphate (plasticizer) | 7.8 |
| Biphenyldiphenyl phosphate (plasticizer) | 3.9 |
| Methylene chloride (first solvent) | 300 |
| Methanol (second solvent) | 45 |
| Colorant(SUMIKA FineChem 360FP) | 0.0009 |

The retardation increasing agent shown below (16 mass parts), methylene chloride (80 mass parts), and methanol (20 mass parts) were charged in another mixing tank and stirred under heating to obtain a retardation increasing agent solution.

The cellulose acetate solution (464 mass parts) of the above composition was mixed with the retardation increasing agent solution (36 mass parts), silicon dioxide particles (AEROSIL R972, 1.1 mass parts). The mixture was sufficiently stirred to prepare a dope. The amount of the added retardation increasing agent was 5.0 mass parts per 100 mass parts of cellulose acetate, and the amount of the added silicon dioxide particles was 0.15 mass parts per 100 mass parts of cellulose acetate.

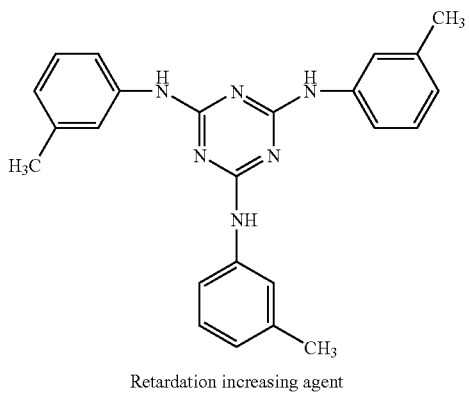

Retardation increasing agent

The dope thus obtained was cast by band casting apparatus. Upon the film surface temperature on band being 40° C., the film was dried for 1 minute, and peeled off from the band. Then, the film was dried with drying air to obtain the cellulose acetate film (CA-1) with 0.3 weight % of residual solvent amount (thickness: 109 μm).

The retardation at the wavelength 550 nm of the prepared cellulose acetate film was measured to obtain Rth retardation value of 85 nm and Re retardation value of 7 nm.

Saponification Treatment and Alignment Film Formation

Dielectric heating roll at 60° C. was passed on the cellulose acetate film (CA-1). After the surface temperature of the film was reached to 40° C., an alkaline solution having the following composition (S-1) was applied on the surface by using a rod coater at an amount of 15 ml/m². The coated film was retained under a steam-type far-infrared heater manufactured by Noritake Company Limited which was heated up to 110° C., then purified water was applied to the film by using a rod coater at an amount of 3 ml/m². The film temperature at this moment was 40° C. Subsequently, after cleaning with water by using a fountain coater and draining of the water were repeated three times, the film was retained in a drying zone at 70° C. for 5 minutes to be dried.

| <Composition of alkaline solution (S-1) (part by weight)> | |
|---|---|
| Potassium hydroxide | 8.55 |
| Water | 23.235 |
| Isopropanol | 54.20 |
| Surfactant (K-1: $C_{14}H_{29}O(CH_2CH_2O)_2OH$) | 1.0 |
| Propyleneglycol | 13.0 |
| Defoaming agent Surfynol DF110D (Nissin Chemical Industry Co., Ltd.) | 0.015 |

To the surface treated film, a coating liquid of the following composition was applied by a load coater with an amount of 28 mL/m², and dried for 60 seconds with warm air of 60° C. and for 150 seconds with warm air of 90° C.

| Composition of a coating liquid for forming an alignment film (part by weight) | |
|---|---|
| Denatured polyvinyl alcohol shown below | 20 |
| Water | 360 |

| -continued | |
|---|---|
| Composition of a coating liquid for forming an alignment film (part by weight) | |
| Methanol | 120 |
| Glutaraldehyde | 0.5 | denatured polyvinyl alcohol

—(CH$_2$—CH)$_{87.8}$—
           |
           OH

—(CH$_2$—CH)$_{12.0}$—
           |
           O—CO—CH$_3$

—(CH$_2$—CH)$_{0.2}$—
           |
           O—CO—⬡—O—(CH$_2$)$_4$—O—CO—CH=CH$_2$

Then a rubbing treatment was conducted in the longitudinal direction of the surface of the formed alignment film.

Preparation of Optically Anisotropic Layer

To a surface of the alignment film, the coating solution having the following composition containing a discotic liquid crystalline compound (DA-1:concentration of the solid part: 32.6%; MEK solvent) was applied with a #3.2 wire bar coater. It was then heated for 3 minutes in a thermostat zone of 125° C. to align the discotic liquid crystalline molecules. It was then subjected to a UV irradiation at 500 mJ/cm², with a high-pressure mercury lamp, and left to cool down to room temperature to obtain an optical compensation sheet (KS-1).

| Composition of coating solution containing a discotic liquid crystalline compound (DA-1) (part by weight) | |
|---|---|
| Discotic liquid crystalline compound shown below | 9.1 |
| Ethylene oxide-modified trimethylolpropane triacrylate (V#360, manufactured by Osaka organic chemistry Co., Ltd.) | 0.9 |
| Cellulose acetate butyrate (CAB551-0.2, manufactured by Eastman Chemical Ltd.) | 0.2 |
| Cellulose acetate butyrate (CAB531-1, manufactured by Eastman Chemical Ltd.) | 0.05 |
| IRGACURE 907 | 0.3 |
| KAYACURE DETX (manufactured by Nippon Kayaku Co., Ltd.) | 0.1 |

DLC-A

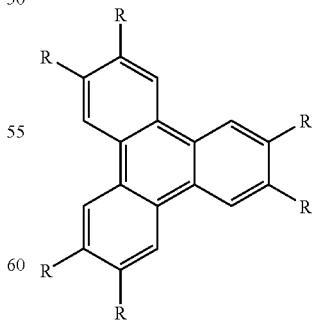

R; 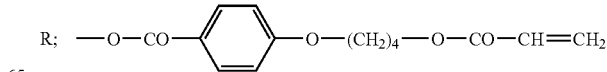

Example 1 to 5

Preparation of Transparent Support

The cellulose acetate film (CA-1) was prepared in the same manner as that in Comparative Example 1.

Saponification Treatment and Alignment Film Formation

The cellulose acetate film (CA-1) was subjected to the saponification treatment, the alignment film formation, and the rubbing treatment in the same manner as that in Comparative Example 1.

Preparation of Optically Anisotropic Layer

Coating solutions containing a discotic liquid crystalline compound (DA-2 to DA-6) having a composition similar to that of the coating solution (DA-1) in Comparative example 1 were prepared by using the compounds described in Table 1 at the amount described in Table 1 instead of IRGACURE 907 and KAYACURE DETX as a photo-polymerization initiator. The coating solutions were applied in a similar manner to that of Comparative example 1 to obtain optical compensation sheets (KS-2 to KS-6).

Comparative Example 2 to 4

Preparation of Transparent Support

The cellulose acetate film (CA-1) was prepared in the same manner as that in Comparative Example 1.

Saponification Treatment and Alignment Film Formation

The cellulose acetate film (CA-1) was subjected to the saponification treatment, the alignment film formation, and the rubbing treatment in the same manner as that in Comparative Example 1.

Preparation of Optically Anisotropic Layer

Coating solutions containing a discotic liquid crystalline compound (DA-7 to DA-9) having a composition similar to that of the coating solution (DA-1) in Comparative example 1 were prepared by using the compounds described in Table 1 at the amount described in Table 1 instead of IRGACURE 907 and KAYACURE DETX as a photo-polymerization initiator. The coating solutions were applied in a similar manner to that of Comparative Example 1 to obtain optical compensation sheets (KS-7 to KS-9).

Comparative Example 5

Preparation of a Transparent Support

The following composition was charged in a mixing tank and stirred under heating, to dissolve the individual ingredients to prepare a cellulose acetate solution.

| <Composition of cellulose acetate solution (part by weight)> | |
|---|---|
| Cellulose acetate with an acetylation degree of 60.9% | 100 |
| Triphenyl phosphate (plasticizer) | 7.8 |
| Biphenyldiphenyl phosphate (plasticizer) | 3.9 |
| Methylene chloride (first solvent) | 300 |
| Methanol (second solvent) | 45 |
| Colorant(SUMIKA FineChem 360FP) | 0.0009 |

The above retardation increasing agent (16 mass parts), methylene chloride (80 mass parts), and methanol (20 mass parts) were charged in another mixing tank and stirred under heating to obtain a retardation increasing agent solution.

The cellulose acetate solution (464 mass parts) of the above composition was mixed with the retardation increasing agent solution (36 mass parts), silicon dioxide particles (AEROSIL R972, 1.1 mass parts). The mixture was sufficiently stirred to prepare a dope. The amount of the added retardation increasing agent was 5.0 mass parts per 100 mass parts of cellulose acetate, and the amount of the added silicon dioxide particles was 0.15 mass parts per 100 mass parts of cellulose acetate.

The dope thus obtained was cast by band casting apparatus. Upon the film surface temperature on band being 40° C., the film was dried for 1 minute, and peeled off from band. Then, the film was dried with drying air to obtain the cellulose acetate film (CA-2) with 0.3 weight % of residual solvent amount (thickness: 88 μm).

The retardation at the wavelength 550 nm of the prepared cellulose acetate film was measured to obtain Rth retardation value of 175 nm and Re retardation value of 36 nm.

Saponification Treatment and Alignment Film Formation

The same treatment was conducted as that in the Comparative example 1.

Preparation of Optically Anisotropic Layer

To a surface of the alignment film, the coating solution having the following composition containing a discotic liquid crystalline compound (DA-10:concentration of the solid part: 35.5%; MEK solvent) was applied with a #3.2 wire bar coater. It was then heated for 3 minutes in a thermostat zone of 125° C. to align the discotic liquid crystalline molecules. It was then subjected to a UV irradiation at 500 mJ/cm$^2$, with a high-pressure mercury lamp, and left to cool down to room temperature to obtain an optical compensation sheet (KS-10).

| <Composition of coating solution containing a discotic liquid crystalline compound (DA-10) (part by weight)> | |
|---|---|
| Discotic liquid crystalline compound shown above | 9.1 |
| Ethylene oxide-modified trimethylolpropane triacrylate (V#360, manufactured by Osaka organic chemistry Co., Ltd.) | 0.9 |
| Cellulose acetate butyrate (CAB531-1, manufactured by Eastman Chemical Ltd.) | 0.15 |
| IRGACURE 907 | 0.3 |
| KAYACURE DETX (manufactured by Nippon Kayaku Co., Ltd.) | 0.1 |

Example 6 to 10

Preparation of Transparent Support

The cellulose acetate film (CA-2) was prepared in the same manner as that in Comparative Example 2.

Saponification Treatment and Alignment Film Formation

The cellulose acetate film (CA-2) was subjected to the saponification treatment, the alignment film formation, and the rubbing treatment in the same manner as that in Comparative Example 2.

Preparation of Optically Anisotropic Layer

Coating solutions containing a discotic liquid crystalline compound (DA-11 to DA-15) having a composition similar to that of the coating solution (DA-10) in Comparative example 2 were prepared by using the compounds described in Table 1 at the amount described in Table 1 instead of IRGACURE 907 and KAYACURE DETX as a photo-polymerization initiator. The coating solutions were applied in a similar manner to that of Comparative example 2 to obtain optical compensation sheets (KS-11 to KS-15).

Comparative Example 6

Preparation of Transparent Support

The cellulose acetate film (CA-1) was prepared in the same manner as that in Comparative Example 1.

Saponification Treatment and Alignment Film Formation

The cellulose acetate film (CA-1) was subjected to the saponification treatment, the alignment film formation, and the rubbing treatment in the same manner as that in Comparative Example 1.

Preparation of Optically Anisotropic Layer

To a surface of the alignment film, the coating solution having the following composition containing a rod-like liquid crystalline compound (DA-16:concentration of the solid part: 35.5%; MEK solvent) was applied with a #3.2 wire bar coater. It was then heated for 2 minutes in a thermostat zone of 95° C. to align the rod-like liquid crystalline molecules. It was then subjected to a UV irradiation at 500 mJ/cm$^2$, with a high-pressure mercury lamp, and left to cool down to room temperature to obtain an optical compensation sheet (KS-16).

| Composition of coating solution containing a rod-like liquid crystalline compound (DA-16) (part by weight) | |
|---|---|
| Rod-like liquid crystalline compound BLC-A shown below | 9.1 |
| Fluorine containing binder BT-A shown below | 0.5 |
| Orientation promoting agent HA-A shown below | 1.0 |
| IRGACURE 907 | 0.3 |
| KAYACURE DETX (manufactured by Nippon Kayaku Co., Ltd.) | 0.1 |

BLC-A

BT-A

HA-A

-continued

Composition of coating solution containing a rod-like liquid crystalline compound (DA-16) (part by weight)

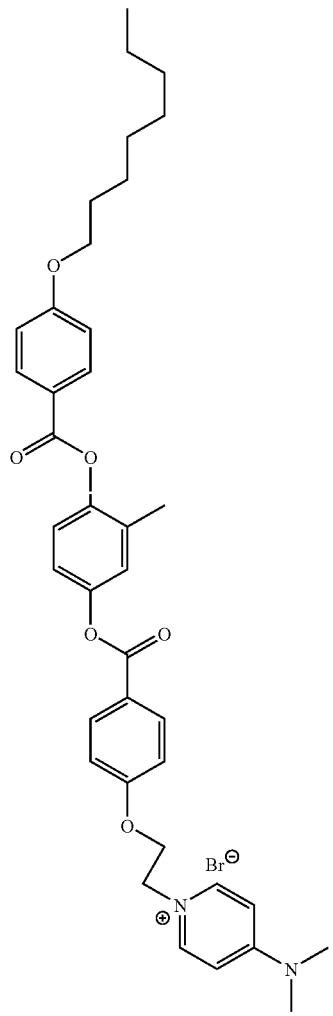

Example 11 to 15

Preparation of Transparent Support

The cellulose acetate film (CA-1) was prepared in the same manner as that in Comparative Example 1.

Saponification Treatment and Alignment Film Formation

The cellulose acetate film (CA-1) was subjected to the saponification treatment, the alignment film formation, and the rubbing treatment in the same manner as that in Comparative Example 1.

Preparation of Optically Anisotropic Layer

Coating solutions containing a rod-like liquid crystalline compound (DA-17 to DA-21) having a composition similar to that of the coating solution (DA-16) in Comparative example 6 were prepared by using the compounds described in Table 1 at the amount described in Table 1 instead of IRGACURE 907 and KAYACIJRE DETX as a photo-polymerization initiator. The coating solutions were applied in a similar manner to that of Comparative example 6 to obtain optical compensation sheets (KS-17 to KS-21).

Disappearance rate of unsaturated groups of liquid crystalline molecules residues in each of the optical compensation films obtained in Example 1 to 15 and Comparative Example 1 to 4 is determined by FT-IR method. Results are shown in Table 1. The higher value indicates the higher sensitivity. Coloring of the films after light irradiation were examined by absorption spectral method. Optical concentrations at 380 nm are shown in Table 1. The lower concentration indicates the less coloring.

|  | Photopolymerization initiator (part by weight) | | Disappearance rate of unsaturated group % ($500 \text{ mJ/cm}^2$) | Absorbance at 380 nm |
|---|---|---|---|---|
|  | 1 | 2 | | |
| Example 1 | A-3(0.3) | B-6(0.1) | 83 | 0.1 |
| Example 2 | A-15(0.3) | B-4(0.1) | 86 | 0.12 |
| Example 3 | A-12(0.3) | C-3(0.1) | 83 | 0.13 |
| Example 4 | A-15(0.3) | E-4(0.3) | 80 | 0.12 |
| Example 5 | A-16(0.3) | C-4(0.1) | 79 | 0.11 |
| Example 6 | A-10(0.2) | B-9(0.2) | 78 | 0.1 |
| Example 7 | A-9(0.3) | D-2(0.1) | 85 | 0.12 |
| Example 8 | A-15(0.1) | B-8(0.3) | 80 | 0.13 |
| Example 9 | A-14(0.2) | E-6(0.2) | 82 | 0.08 |
| Example 10 | A-2(0.3) | B-7(0.1) | 79 | 0.1 |
| Example 11 | A-15(0.3) | E-4(0.3) | 92 | 0.09 |
| Example 12 | A-6(0.3) | B-10(0.1) | 90 | 0.12 |
| Example 13 | A-16(0.2) | B-2(0.2) | 88 | 0.11 |
| Example 14 | A-13(0.3) | D-4(0.1) | 88 | 0.12 |
| Example 15 | A-13(0.3) | B-4(0.1) | 90 | 0.11 |
| Comparative Example 1 | Irg907(0.3) | DETX(0.1) | 65 | 0.12 |
| Comparative Example 2 | A-15(0.3) |  | 57 | 0.1 |
| Comparative Example 3 | B-4(0.3) |  | 40 | 0.3 |
| Comparative Example 4 | LD-5(0.2) | DEABP(0.2) | 55 | 0.35 |
| Comparative Example 5 | Irg907(0.3) | DETX(0.1) | 63 | 0.12 |
| Comparative Example 6 | Irg907(0.3) | DETX(0.1) | 70 | 0.12 |

Irg907: IRGACURE 907; DETX: KAYACURE DETX (manufactured by Nippon Kayaku Co., Ltd.)

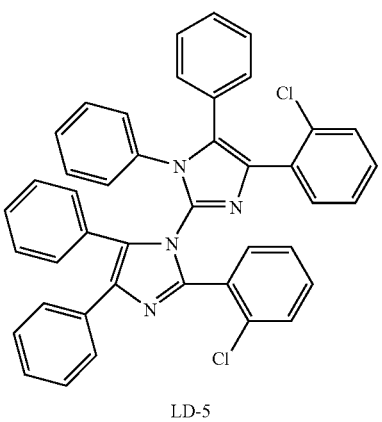

LD-5

-continued

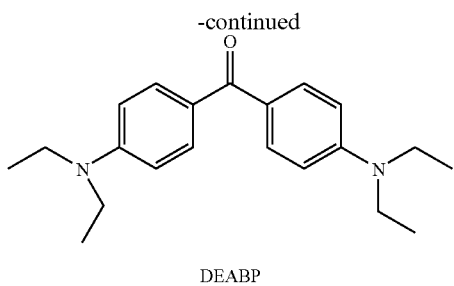

DEABP

When the Example 1 to 15 and Comparative Example 1 to 4 are compared, it is clear that the photo-polymerization initiator system in the optical compensation sheet of the present invention has high sensitivity and the optical compensation sheet of the present invention has less coloring.

INDUSTRIAL APPLICABILITY

The optical compensation sheet of the present invention can be produced in high speed and in a resource saving manner because polymerization and hardening reaction is promoted in the formation of its optical anisotropic layer. The photo-polymerization initiator has less absorbance in the visible region of light, and thus the optical compensation sheet of the present invention has less coloring.

CROSS-REFERENCE TO RELATED APPLICATIONS

This application claims benefit of a priority under 35 USC 119 to Japanese Patent Application No. 2005-312276 filed on Oct. 27, 2005.

The invention claimed is:

1. An optical compensation sheet having an optically anisotropic layer comprising a liquid crystalline compound fixed by using a photo-polymerization initiator system on a transparent support, wherein the photo-polymerization initiator system comprises at least one acylphosphine compound and at least one aromatic ketone compound selected from the group consisting of xanthene compounds, xanthone compounds, thioxanthone compounds, and acridone compounds.

2. The optical compensation sheet according to claim 1, wherein the liquid crystalline compound is fixed at an oriented state by polymerization.

3. The optical compensation sheet according to claim 1, which further comprises an alignment film.

4. The optical compensation sheet according to claim 3, wherein the alignment film comprises an organic compound having a polymerizable group.

5. The optical compensation sheet according to claim 1, wherein the transparent support is a cellulose acylate film.

6. A polarizing plate which comprises the optical compensation sheet according to claim 1, a transparent protective film, and a polarizing film.

7. A liquid crystal display device which comprises the polarizing plate according to claim 6 and a liquid crystal cell.

* * * * *